United States Patent [19]

Daly et al.

[11] 3,760,181

[45] Sept. 18, 1973

[54] UNIVERSAL VIEWER FOR FAR INFRARED

[75] Inventors: Patrick J. Daly, Alexandria; William E. Grogg, Fairfax; Stuart F. Layman, Woodbridge; Harold J. Orlando, Alexandria, all of Va.; James E. Perry, Bethesda, Md.; Dennis P. Van Derlaske, Alexandria, Va.

[73] Assignee: The United States of America as represented by the Secretary of the Army, Washington, D.C.

[22] Filed: Mar. 3, 1972

[21] Appl. No.: 231,545

[52] U.S. Cl. .......... 250/83.3 H, 330/124

[51] Int. Cl. .......... G01t 1/16

[58] Field of Search .......... 250/83.3 H; 330/124

[56] References Cited

UNITED STATES PATENTS

| | | | |
|---|---|---|---|
| 3,699,341 | 10/1972 | Quillinan | 250/83.3 H |
| 3,508,051 | 4/1970 | Nichols | 250/83.3 H |
| 3,641,348 | 2/1972 | Schwarz | 250/83.3 H |
| 1,669,128 | 5/1928 | Hoxie | 330/124 |
| 1,705,993 | 3/1929 | Oswald | 330/124 |
| 1,891,297 | 12/1932 | Wintringham | 330/124 |

*Primary Examiner*—Harold A. Dixon
*Attorney*—Harry M. Saragovitz et al.

[57] ABSTRACT

The viewer is an all solid-state device employing diode detectors and display diodes of the light emitting type. Mechanical-optical scanning is employed to economize on diodes and to avoid the use of tube scanners. Novel optical arrangements are provided particularly in the IR portion of the device to provide a broad range of operation with a minimum of critical optical components. The image quality is maximized by a special configuration of the diode arrays and novel processing techniques of the analog electrical signals generated.

10 Claims, 10 Drawing Figures

UNIVERSAL VIEWER FOR FAR INFRARED

The invention described herein may be manufactured, used and licensed by or for the Government for governmental purposes without payment to us for royalty thereon.

BACKGROUND OF THE INVENTION

This invention relates to a viewing device to detect and identify objects and/or backgrounds by means of radiant electromagnetic waves in the far infrared region. The spectral region of chief interest is the band of wavelengths lying between 8 and 14 microns although it will become clear in the detailed specifications to follow that some of the techniques disclosed will apply to other spectral regions as well. Since the eye cannot detect radiation at these wavelengths various forms of wavelength conversion devices are used to render the images visible.

Originally these devices consisted of films the optical quality of which was altered by the energy or heat deposited by the IR rays. More recently, however, solid state electronic sensors have proven to be the most sensitive and reliable converters available. A number of applications of these devices have been accomplished, but in each case the design has been different, so that there has been little buildup of basic components for use in larger systems. The purpose of the present device is to provide a universal viewing system that will be readily adaptable to a variety of applications. The components consist of modular units for ease of production and maintenance. Economy has been exercised with regard to the number of critical optical components including th solid state sensors since such components continue to be very expensive.

SUMMARY OF THE INVENTION

Image forming refractive elements fabricated from germanium are used prior to wavelength conversion. Lenses and prisms made from normal optical glass are used after conversion. To simplify production and maintenance the device is divided into a number of modules two of which contain the IR refractive image forming lenses. Other modules contain an IR detector array, an array of solid state image forming elements, a scanning device and various components of the visible optic system. The scanning device is housed in a central module and includes a powered scan mirror having opposed surfaces which serve both IR and visible optic systems in a coordinated functional relationship which will be described. The mirror surfaces have conventional protective coatings, but the coatings on each surface is different to provide optical reflections centered at 8,000 A. on one side and over the band from 8 to 14 microns on the other side. An external electrical power source is required to energize the scan mirror and solid state components. A special solid state amplifier couples the detector and image forming elements. The system also requires a stirling cycle refrigerator to provide the low operating temperature necessary for the detector diodes.

In general, the operation of the device is quite simple although the interrelation of components and some of the components themselves is considered to be unique and novel. The objective optics form an IR image of a scene to be viewed which may be for example about one inch square on a target surface a staggered vertical row of solid state IR detectors. In the image forming process the image is reflected by a scan mirror oscillating about a vertical axis to cause up to a one inch displacement of the image on the target surface. The instantaneous line image after being converted to analog electrical signals by the detectors is processed by a plurality of solid state amplifiers (at least one per detector) and applied to a row of light emitting diodes (LEDs) which are geometrically similar and similarly arrayed with respect to the IR detectors. The LEDs are viewed through the visible optics system after being reflected again by the same scan mirror, thereby representing the two dimensional IR image in visible form.

BRIEF DESCRIPTION OF THE DRAWINGS

The novel mechanical and functional aspects of the viewer are best understood with reference to the detailed drawings wherein.

DETAILED DESCRIPTION OF THE PREFERRED EMBODIMENT

Figure 1:
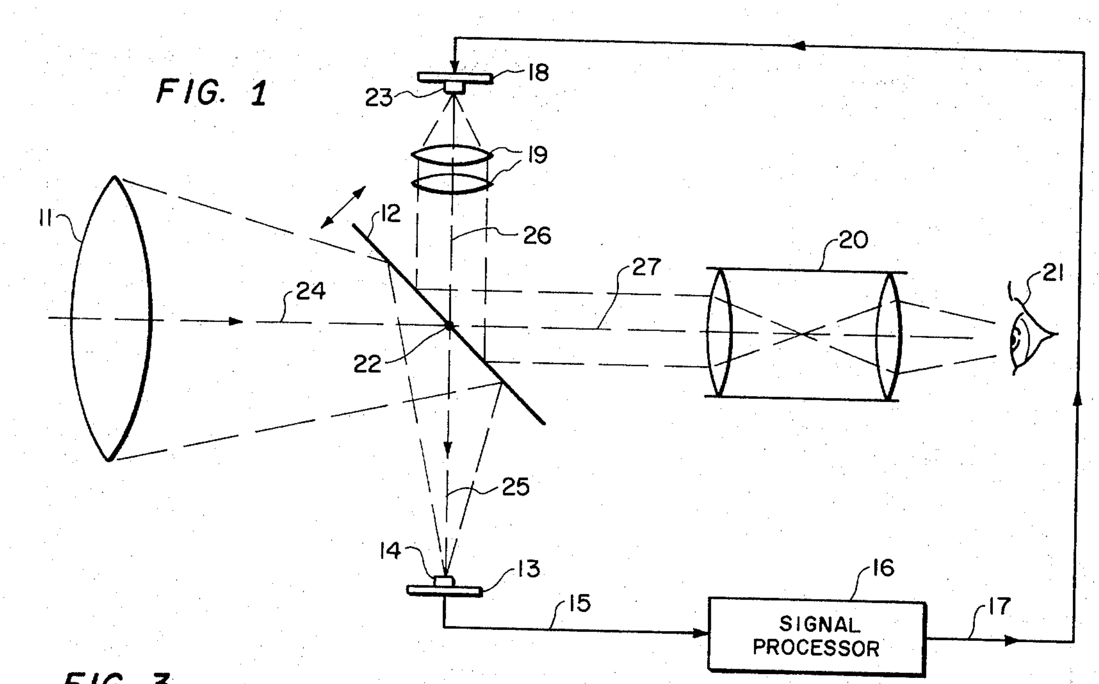
FIG. 1 is a simplified sketch using representative elements from the invention to illustrate the basic functioning of the device.

Referring to FIG. 1, a basic IR viewer is shown with many of the elements removed to more simply demonstrate the mode of operation employed. An objective lens assembly 11 is used to project an image along optical paths 24 and 25 onto a target surface 13 after reflection from an oscillating mirror 12. A linear array of infrared (IR) diode detectors 14 is attached to the target surface. The array is substantially parallel to the axis 22 of the rotatable mirror, both of which extend normally into the plane of the drawing. The mirror oscillates about its axis with sufficient amplitude to sweep the entire image or at least the portions of interest across the linear array. The output of each detector in the array is individually connected through a first conducting path 15 to a signal processor and amplifier 16. The resulting output signal is transmitted over a second conducting path 17 to a corresponding light emitting diode (LED) in a second array 23 mounted on a support member 18. The light image produced by the second array is projected by a collimating lens 19 along optical paths 26 and 27 reflecting from the back surface of mirror 12. The action of the mirror converts the line image to a visible image of the IR scene originally collected by the objective 11. Since the temperature radiation spectra and reflection coefficients for far IR light are quite different from visible or near IR, a considerable amount of information is displayed which cannot be seen with conventional optical aids.

Figure 2:
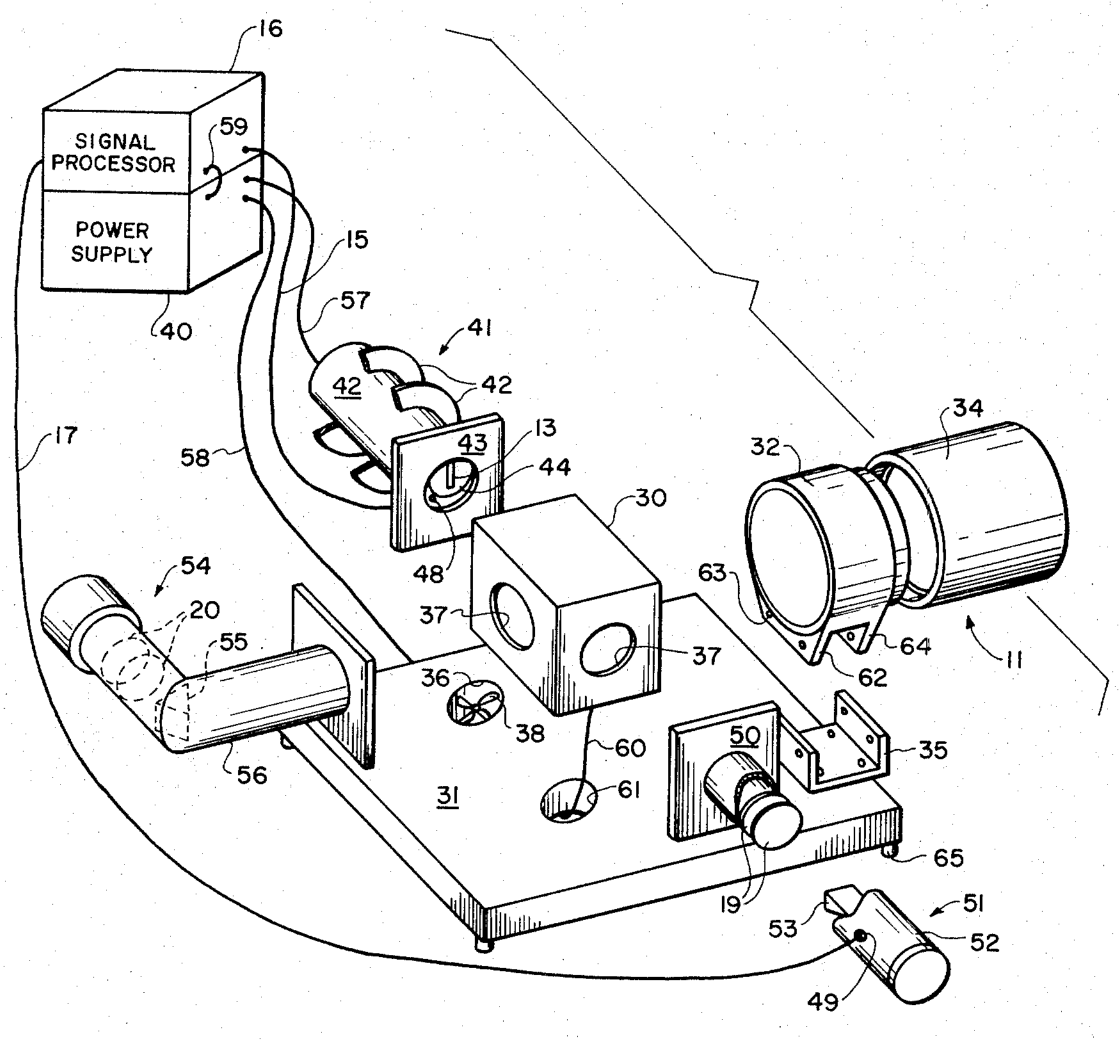
FIG. 2 is an exploded view of the entire device with some portions cutaway to show modular components.

FIG. 2 shows a complete embodiment of the viewer according to the invention, although all components cannot be seen in detail. The viewer is divided into replaceable modules and two pieces of peripheral equipment which can be shared with other viewers or related equipment. The heart of the viewer is a scanner module 30 which is centrally mounted on a base module 31. The scanner has two mutually perpendicular pairs of parallel planar side walls, each wall having a port 37 for optical or IR communication. The base includes a fan 38 which directs a flow of air upward behind the scanner through port 36; its purpose will be explained later. The base stands on legs 65 so that its open underside will permit air flow to the fan. The scanner module houses the rotatable mirror 22 from FIG. 1 so that the four optical paths 24, 25, 26 and 27 therein pass through the ports 37 in FIG. 2. The remaining modules are arranged around the central module 30 and some are coupled to peripheral sources 40 and 16 of electrical power and signal amplification.

The objective 11 from FIG. 1 consists of two coupled cylindrical modules 32 and 34 adjacent a first side wall of module 30. The basic objective module 32 is attached to the base 31 by the adjustable bracket 35. Details of this bracket are described at FIGS. 9 and 10. Adjustment of bracket 35 permits lateral movement without rotation of module 32 parallel or perpendicular to the first side wall of module 30 as well as adjustment of the azimuth elevation to permit alignment of the optical axis of the two modules and to adjust the focal point of the objective. Module 32 alone is capable of focusing images within the midrange of the viewers capability.

For extended or telescopic ranges the afocal module 34 is attached. For this purpose module 32 may be provided with a reduced portion so that module 34 will overlap and frictionally engage it. Detents, threads or bayonet coupling methods can also be used to insure proper engagement. The opposite ends of module 34 are made identical so that both will couple the basic objective module and can, therefore, be reversed to provide a short range capability. In some applications module 34 may be separately mounted on the base for rotation about an axis perpendicular to the optical axis and for translation completely off the optical axis by motorized means. (See FIGS. 9 and 10) In situations where precise focus over the entire range is not required a motorized reversible movie type zoon focus lens may be employed.

Figure 6:
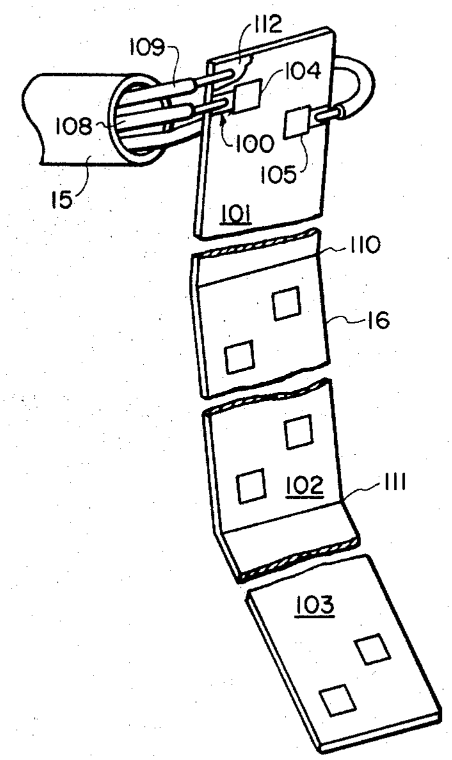
FIG. 6 is an isometric view of the IR detection array from FIG. 1.

A detector module 41 is attached to a second side wall of the scanner module 30 orthogonally related to the first side wall. The detector is enclosed in a coupling 43 connected directly to module 30. Attached to the coupling 43 is a stirling cycle refrigerator 42 which has radiating fins 42. The fins cooperate with the air flow from fan 38 to increase the refrigerator's efficiency. The refrigerator presents a cold head 44 inside the coupling member 43. A suitable refrigerator is provided by the commercially available Malaker Model Mark XV. The IR target 13 is a narrow strip of thermally conducting material which is fastened directly to the cold head. The target presents flat portions as nearly normal to the incident IR rays as practical. Detector diodes (not shown) are mounted on these flat portions facing module 30. Details of these diodes are shown in FIG. 6. The detectors in turn are electrically connected to individual lead conductors in cable 15 which exits through aperture 48 in coupling 43. The lead conductors transmit analog signals of the incident IR to the signal processor 16. Details of the detectors, target and electrical connections of these elements to cable 48 are shown in FIG. 6.

Attached to the third wall 50 opposite the second wall of module 30 is LED module 51. Again the components are enclosed in a LED housing 52. Cable 17 passes through an aperture 49 in the wall of the housing and includes a separate lead for each of the amplified signals from the detectors. Each lead is connected to a light emitting diode in a line array not shown. Details of these connections will be discussed in association with FIGS. 6 and 7. The LED array is mounted on one face of a right angle image inverting prism 53 the largest face of which is silvered in the conventional manner. The collimating lenses 19 are mounted inside the housing 52 between the prism 53 and module 30 to project a parallel ray image of the line array of radiating LEDs.

The last module connected to module 30 at its fourth wall opposite the objective module is the eyepiece module. Here again the components are in a housing 56. A right image correcting prism 55 is provided to correct left-to-right transposition of the image. Conventional eyepiece lenses 20 are provided to permit the users eye to view the image with any desired degree of eye relief. Power supply 40 is connected to signal processor 16, cooler 42 and the fan 38 over cables 57, 58 and 59 to render these modules operable. Cable 60 relays power from the fan to module 30 for the mirror drive.

Figure 3:
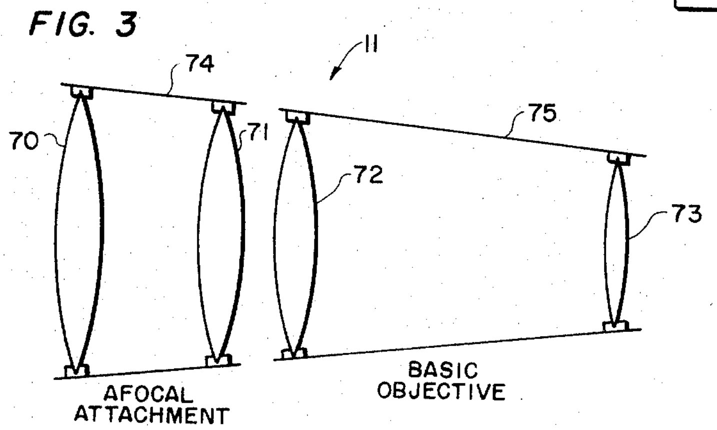
FIG. 3 is a detailed view of the IR objective lenses from FIG. 1.

FIG. 3 shows a detailed view of the optics in the objective modules 32 and 34 from FIG. 2. Objective module 32 contains a pair of double convex lenses 72 and 73 which may be three and five inch lenses, for example. The lenses have retainers 74 and 75 to hold the relative positions of the lenses in each pair in their housings. Alternatively the inside of the housings may be fabricated with interior stops to maintain their spacing. The basic objective lens is chosen to cover an intermediate range of operation while the afocal lens is added to achieve near and telephoto ranges. Exact ranges will depend on the system application.

Figure 4:
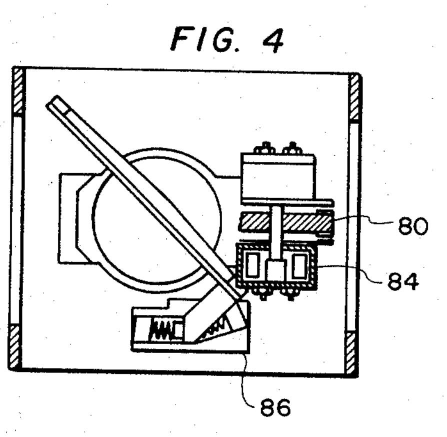
FIG. 4 is a top view of the scanner mechanism from FIG. 2.
Figure 5:
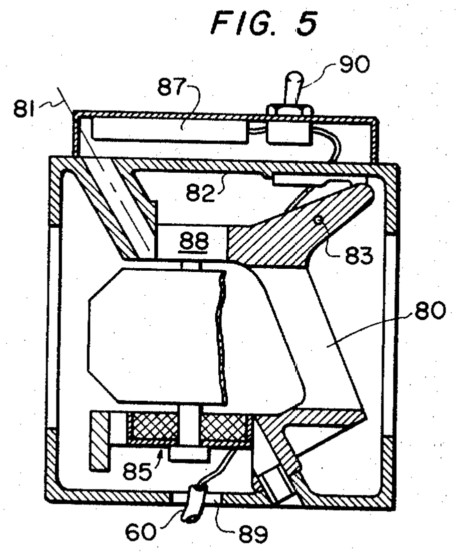
FIG. 5 is a side view of the mechanism in FIG. 4.
Figure 7:
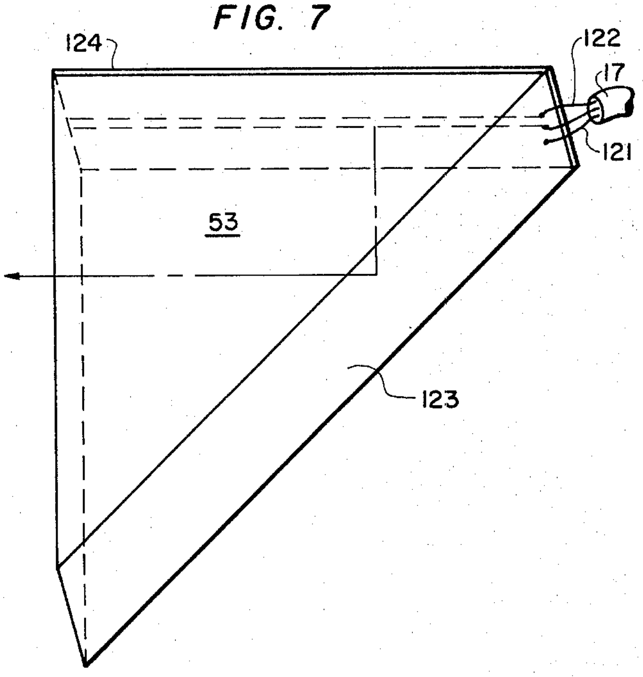
FIG. 7 is an isometric view of the light emitting diode array from FIG. 1.

FIGS. 4 and 5 are top and front views respectively of the scanner module 30. A gimbal member 80 is mounted for rotation within the module about an axis 81 inclined approximately 30° and lies in a vertical plane perpendicular to the detector or LED sides. An interlace dumbell shaped solenoid 84 is mounted on the underside of the top wall 82 of the module. An aperture 83 on the gimbal member spaced from the axis thereof permits the gimbal member 80 to be slidably captured between the solenoids, which act as limit stops. The purpose of this structure is to provide an interlace action that will be best understood when FIGS. 6 and 7 are described. The mirror 12 is mounted for rotation about a vertical axis assuming the gimbal is about midway between the most extreme positions of the solenoid stops, To power the scanner a torque motor 85 is coupled between the module 30 and the lower end of mirror 12 to drive it about its axis in a counterclockwise direction as viewed in FIG. 4. A spring unit 86 is used to supply a restoring torque tending to center the mirror. A tachometer is coupled between the upper end of the mirror and the module to sense the instantaneous position of the mirror. The output of tachometer 88, a piezolectric torqued sensor, is fed to a logic circuit 87 mounted atop the module which in turn controls the current to torque motor 85. The complete wiring detail between these elements has been omitted so as not to obscure other detail in the drawings. This feed back arrangement produces steady oscillations of the mirror. (Normally 20 cps) The logic circuit also reverses the position of the solenoid plunger for each mirror scan. An aperture 89 in the base of module 30 communicates with aperture 61 in base 31 (shown in FIG. 2) to admit a power cable 60. The power cable connects through on-off switch 90 to logic module 87. Having described the objective and scanner modules the next functional element not completely described is the detector represented by element 13 in FIG. 2.

FIG. 6 shows the IR target element 16 in detail indluding its relationship to the cold head 44 of the cooler and to the cable 15 all shown in FIG. 2. The target element 16 supposrts and forms one semiconducting layer for two rows of diodes such as 104 and 105 formed by conventional mask-diffusion techniques in staggered relationship along its slightly more than one inch length. These are conventional Mercury-Cadmium-Telluride elements. Each diode extends 4 mils along the targets length and is 3 mils wide. Allowing for 3 mils between rows and equal amounts along each edge for terminals 100, the width of the entire target is approximately 15 mils. The centers of the detectors are space 12 mils apart in each row with centers in one row centered between the centers in the other. This arrangement causes a one mil overlap between interlaced scan lines preventing dark line formations. The terminals 100 are conductive films attached to the top layer of the diodes such as 104 and 105 and insulated from the target element 16. The cable 15 carries a common return wire 109 and one lead 108 for each diode. The return wire 15 is connected directly to the target element which may have a terminal either on its front or back surface for this purpose. The lead wires are connected to their respective individual terminals to form an array of one hundred and seventy six detectors. As previously stated, the surface carrying the diodes is oriented as nearly normal to the incident IR as possible. Since the diodes are fabricated on a flat surface, the target 16 is actually divided into a series of substantially equal flat segments 101, 102, and 103 tangent at their centers to the curved image field formed by bends such as 110 and 111. Three sections were found to be a sufficiently close approximation for this application with a bend angle of 3 ⅓ degrees. The upper and lower flat portions 101 and 103 carry 59 detectors and the center portion 102 carries 58 detectors. A similar structure is mounted in the LED module 51 shown in FIG. 2.

FIG. 7 shows a more detailed view of the LED module. The right angle prism 53 has a mirror surface on its long rectangular edge 123. Along the short upper rectangular edge is mounted an LED array 124. This array is structured exactly like the array shown in FIG. 6 except that the active surfaces of the diodes lie in a single plane and the diodes 120 are composed of LED materials (Gallim Arsenide Phosphide). Cable 17 contains the same number of individual lead wires 121 and 122 as cable 15. These are connected to a target supposrt member and individual LED diodes in like manner. The prism will normally be much wider than the array structure. The use of a totally planar array is possible because of the parallel projection. The LED array is coupled to the detector array through the signal processor 16 shown in FIG. 2.

Figure 8:
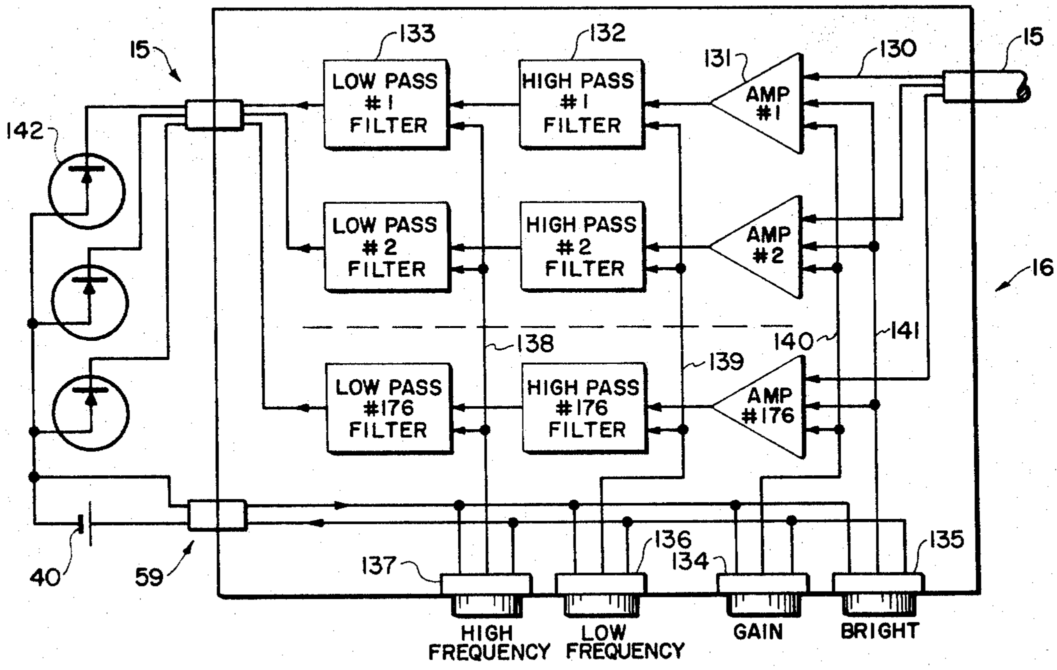
FIG. 8 is a schematic representation of the Signal Processor from FIG. 1.

FIG. 8 shows a somewhat more detailed view of the signal processor from FIG. 2. The power supply 40 to which it is connected by cable 59 can be batteries, dc generators or ac generators with suitable rectifiers. If the system is vehicle mounted or otherwise located near available power sources this portion of the system can be minimized or omitted. The signal processor is tailored for this application. The cable 15 from the detectors is coupled through the wall of the signal processor. Each lead 130 is coupled to the signal input of a separate channel amplifier in the signal processor. Each channel contains as a minimum an amplifier 131, a tunable high-pass filter 132 and a tunable low-pass filter 133. Normally several stages of amplification or filtering will be used as appropriate to the system. At least one amplication stage of each channel (normally the first) has a gain control 134 ganged with that of ever other channel. The maximum dc output level of one amplifier (usually the last) in each channel is also controlled by a ganged arrangement with control 135. A similar arrangement is provided between equivalent low and high pass filter stages with ganged controls 136 and 137. This can be done either mechanical or electrical coupling. The preferred method is to use potentiometers 134–137 as voltage dividers across supply cable 59. Channel elements 131–133 in such an arrangement are bias controlled by the variable voltages on lines 138–141. Each channel output is applied to a separate LED 142. Controlling these stages not only permits viewing the scene at different levels of brightness, but at different noise levels and differing conditions of contrast.

Figure 9:
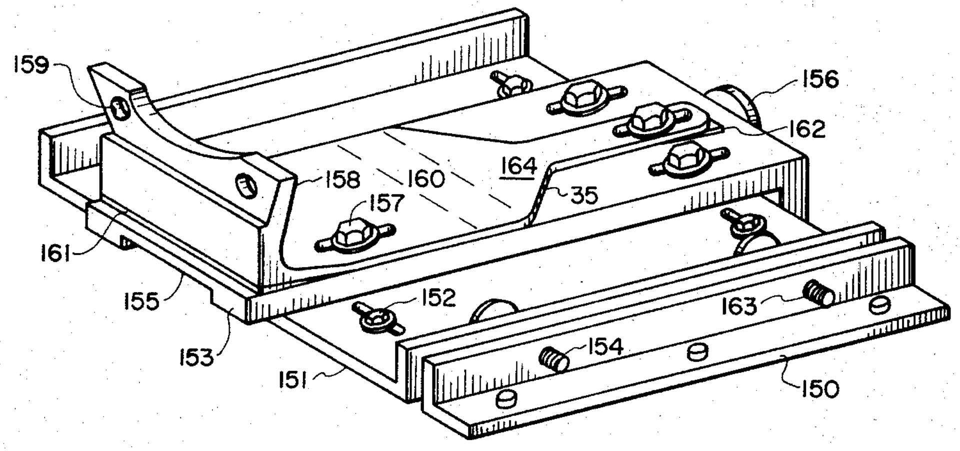
FIG. 9 is an isometric view of the objective lens supporting bracket.

FIG. 9 is a detailed view of the adjustable bracket shown in FIG. 2 for the objective module. The angle member 150 is firmly attached to base by screws, welding or other convenient means. The transverse carriage plate is fastened to the base by form screws 152 through slots perpendicular to the angle member. The longitudinal plate 153 is fastened to the transverse plate in a similar manner except that the slots are parallel to the angle member. Two adjustment screws 154 and 163 are set in the upstanding leg of the transverse plat so that their only permitted motion with respect to that plate is rotation. The threaded ends of these screws pass through matching holes in the upstanding leg of the angle member.

A similar adjustment screw 156 is set in longitudinal member 153 and threaded into the transverse plate 151. To provide sufficient thickness for screw 156, the center of plate 151 may be thickened opposite edges may be provided with upturned tabs. The plate 151 has a channel 155 to accept the thickened portion or tabs which then prevent rotation during its adjustment. Mounting bracket 35 (also shown in FIG. 2) is mounted on longitudinal plate 153 by additional screws 157. For convenience this may be done through slots parallel to angle member 150. A transverse upstanding leg 158 with holes 159 which match the holes in downstanding leg 62 of the basic objective module 32 shown in FIG. 2 is attached to the end of the longitudinal plate 153. A similar leg is mounted in area 160 on plate 153 to engage the remaining leg 64 shown in FIG. 2. Shims 161 and 162 are placed under bracket 35 to permit adjustment of the elevation angle of the objective module. Azimuth angle can be adjusted within narrow limits by independently adjusting one of screws 154 or 163. Motors can be coupled to screws 154, 156 or 163 to permit remote adjustment if desired.

Figure 10:
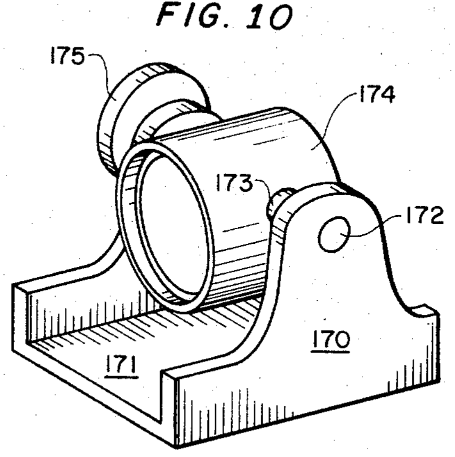
FIG. 10 is a modification of the upper part of supporting bracket shown in FIG. 9.

FIG. 10 shows a modification of mounting bracket 35 from FIG. 9 with a modification of basic objective module 32 or afocal module 34 from FIG. 2. Instead the transverse type of leg 158 shown in FIG. 9, two upturned legs 170 are attached to the longitudinal edges of the bracket base 171. Aperture 172 is provided in legs 170 which is fitted with any suitable bearing to engage an axle member 173. The axle members have their opposite ends attached to a module 174 which may be module 34 or module 32 from FIG. 2. A handwheel or remote controlled motor 175 is attached to the end of one axle where it protrudes outwardly through leg 170. With this arrangement, shims 161 and 162 from FIG. 9 are obviously not needed, nor is the tongue portion 164 in that figure. This arrangement is particularly useful in providing 180° rotation of the afocal module to change from wide angle to telescopic viewing angle. By making the screws 154 and 163 in FIG. 9 long enough, the afocal module can be shifted entirely out of the field of view thereby permitting the use of the basic objective module alone.

The preferred material for housings supports and the like is stainless steel, but obviously other metals or plastics may be substituted. Depending on the method of manufacture, the component parts shown may be decreased or increased in number. It is also preferred that the various parts be attached by using screws and threaded openings in the housings, but welding or similar means may be used instead. The motors, if used, to drive the optical mountings, are standard reversible gear-reduction with control switches and may also include variable speed characteristics. Various other modifications will be apparent to those skilled in-the-art which fall within the preview of the claims.

We claim:

1. In an infrared viewing system wherein a plurality of detector diodes are scanned with an infrared image and wherein each resultant diode output signal is processed by a separate channel including at least one amplifier receiving power and at least one amplifier receiving gain bias from at least one d.c. source with each channel output applied to a separate display device:

a first manually controlled attenuating means coupled between said d.c. source and said channel amplifiers to vary the d.c. voltage supplied to said amplifiers;

a second manually controlled attenuating means coupled between said d.c. source and said channel amplifiers to vary a common bias control signal to each of said amplifiers, whereby the average brightness of said display device and the gain of said amplifiers can be independently controlled;

a separate tunable filter coupled between each of said channel amplifiers and its display device; and a single tuning means gang coupled between all of said filters to tune each to the same cutoff frequency.

2. An infrared viewing system according to claim 1 wherein said detector diodes have a vertical height greater than the vertical spacing between next adjacent diodes and are mounted on a series of flat support members joined end to end with the centers of said support members tangent to the curved field of said infrared image.

3. A viewing system according to claim 1 wherein: said filters are low-pass filters.

4. A viewing system according to claim 1 wherein: said filters are high-pass filters.

5. A viewing system according to claim 1 wherein:

a pair of separate tunable filters are coupled between each of said channel amplifiers and its display device, one a high-pass type and the other being a low pass type, and a separate single tuning means is gang coupled between all of said filters of the same type.

6. A viewing system according to claim 1 wherein the infrared image is formed by a lens system including:

an objective lens to focus images at moderate ranges; and an afocal lens having substantially identical configured ends reversibly mounted with its optical axis collinear with the optical axis of said objective lens whereby said lens system can be converted to either a wide angle close range system or a narrow angle long range system depending on which of said identically configured ends is adjacent said objective lens.

7. A viewing system according to claim 6 wherein said afocal lens is mounted for at least 180° rotation about an axis perpendicular to said optic axis.

8. A viewing system according to claim 6 wherein adjustable means interconnect said objective and afocal lenses to translate one relative to the other independently in three onthogonal directions and to independently adjust the azimuth and elevation angles of said axis.

9. A viewing system according to claim 8 wherein said afocal lens is mounted for at least 180° rotation about an axis perpendicular to said optical axis.

10. A viewing system according to claim 9 wherein at least one of said means to translate and one of said means to rotate the optic axis of said afocal lens is motorized for remote control application.

* * * * *